(12) United States Patent
Kessenich et al.

(10) Patent No.: US 7,155,677 B2
(45) Date of Patent: *Dec. 26, 2006

(54) PORTAL FOR SUPPLYING SUPPLEMENTARY INFORMATION FOR PRINTED BOOKS

(76) Inventors: Diane Kessenich, 2423 N. Ocean Blvd., Gulf Stream, FL (US) 33483; Brett Clark, 842 Carroll St., Apartment 1, Brooklyn, NY (US) 11215

( * ) Notice: Subject to any disclaimer, the term of this patent is extended or adjusted under 35 U.S.C. 154(b) by 232 days.

This patent is subject to a terminal disclaimer.

(21) Appl. No.: 10/628,622

(22) Filed: Jul. 28, 2003

(65) Prior Publication Data

US 2004/0109026 A1 Jun. 10, 2004

Related U.S. Application Data (63) Continuation of application No. 09/618,916, filed on Jul. 18, 2000, now abandoned, which is a continuation-in-part of application No. 09/498,304, filed on Feb. 4, 2000, now abandoned, which is a continuation-in-part of application No. 08/842,952, filed on Apr. 25, 1997, now abandoned, and a continuation-in-part of application No. 08/846,759, filed on Apr. 30, 1997, now Pat. No. 6,034,680.

(51) Int. Cl.
*G06F 3/00* (2006.01)
(52) U.S. Cl. .................. 715/738; 715/733; 715/741; 715/742; 715/501.1; 707/10; 709/217
(58) Field of Classification Search ............ 715/733, 715/738, 741, 742, 744, 745, 747, 760, 854, 715/962, 501.1, 512; 707/10; 709/217, 709/219
See application file for complete search history.

(56) References Cited

U.S. PATENT DOCUMENTS 5,465,213 A 11/1995 Ross
5,597,307 A 1/1997 Redford et al.

(Continued)

OTHER PUBLICATIONS

Watanabe et al., "Visual interface for retrieval of electronic-formed books," IEEE 692-695, 1993.

(Continued)

*Primary Examiner*—Lucila X. Bautista
(74) *Attorney, Agent, or Firm*—Akerman Senterfitt (57) ABSTRACT

A method for supplying hierarchical supplementary information related to printed books in a portal can include several steps. The method can include the steps of first establishing a portal of supplementary information related to printed books. Second, a plurality of different printed books can be distributed to a user base. Third, each different printed book can be associated with a common uniform address. Fourth, a kiosk can be provided for interacting with the portal. Fifth, a user-specified common address can be received from a user in the user base through the kiosk, the user-specified address corresponding to the printed books. Sixth, upon receiving the user-specified common address, a first hypermedia document corresponding to the user-specified common address can be displayed through the kiosk in the portal. The seventh step can include identifying in the first hypermedia document corresponding to the user-specified common address a user class associated with the user. Finally, in response to identifying the associated user class, one of the secondary hypermedia documents can be displayed through the kiosk, the secondary hypermedia documents having supplementary information pertaining to the book associated with the user-specified common address. Moreover, the supplementary information can be consonant with the associated user class.

20 Claims, 9 Drawing Sheets

U.S. PATENT DOCUMENTS

| | | |
|---|---|---|
| 5,734,823 A | 3/1998 | Saigh et al. |
| 5,760,771 A | 6/1998 | Blonder et al. |
| 5,872,850 A | 2/1999 | Klein et al. |
| 5,991,802 A | 11/1999 | Allard et al. |
| 6,088,722 A | 7/2000 | Herz et al. |
| 6,230,202 B1 | 5/2001 | Lewine |
| 6,311,214 B1 | 10/2001 | Rhoads |
| 6,324,538 B1 | 11/2001 | Wesinger, Jr. et al. |
| 6,344,861 B1 | 2/2002 | Naughton et al. |

OTHER PUBLICATIONS

Argentesi et al., "An electronic book for accessing and organising information distributed across Internet: Dynamic WAIS Book," Aug. 1-12, 1995.

PORTAL FOR SUPPLYING SUPPLEMENTARY INFORMATION FOR PRINTED BOOKS

CROSS REFERENCE TO RELATED APPLICATIONS

This application is a Continuation of U.S. application Ser. No. 09/618,916, filed Jul. 18, 2000 now abandoned, which is a Continuation-in-Part of U.S. application Ser. No. 09/498,304, filed Feb. 4, 2000 now abandoned, which is a Continuation-Part of U.S. application Ser. No. 08/842,952, filed Apr. 25, 1997, now abandoned, and U.S. application Ser. No. 08/846,759, filed Apr. 30, 1997 now U.S. Pat. No. 6,034,680.

BACKGROUND OF THE INVENTION

1. Technical Field

This invention relates to the field of publishing, and in particular, to a confluence of printed and electronic publishing in a hypermedia document portal viewable in a retail kiosk.

2. Description of the Related Art

A hypermedia document system has as its primary function establishing links between hypermedia documents, each of which can be expected to provide different kinds of information and data. Books, magazines, journals, newspapers and the like are now widely available in hypermedia document format, under the general category now commonly referred to as electronic publishing. Still, there is a strong feeling among many people that a certain kind of "magic" one can experience curled up in a chair with a good book is utterly lacking in electronic publishing, and always will be lacking. As a result, the two media have always lacked, and continue to lack an advantageous common ground which provides readers with the advantages of both media, namely the "magic" of a book in hand and the extraordinary ability of hypermedia documents to link contextually relevant information contained in various hypermedia documents.

Despite the availability of copies of printed publications in hypermedia document format, and even the availability of electronically published magazines without any corresponding printed versions, until recently, there has not been a confluence of printed and electronic publishing beyond the mere substitution of one medium for the other. Specifically, U.S. Pat. No. 6,034,60 issued on Mar. 7, 2000 to Kessenich et al. (Kessenich) for SUPPLYING SUPPLEMENTARY INFORMATION FOR PRINTED BOOKS teaches the combination of publishing printed material and publishing electronic hypermedia documents in the form of Web pages. Specifically, a method is disclosed in which a plurality of different printed books are distributed to a user base, where each book has a corresponding title. A common Internet address can be associated with each different printed book having a common title. In a first Web page at the common Internet Web address, a user in the user base can be identified according to a particular user class. Responsive to identifying the user class, a second Web page can be provided which as supplementary information pertaining to the book associated with the common Internet Web address. Significantly, the supplementary information is consonant with the user class.

Still, in implementing the method disclosed in Kessenich, each printed book must contain a reference to the common Internet address. Thus, there typically exists a linkage between the publisher of the printed book and the provider of the Web pages. Consequently, the Kessenich method cannot easily accommodate printed books supplied by multiple publishers without further providing Web pages containing the supplemental information provided by multiple electronic publishers. This limitation however, can inhibit the use of the Kessenich method in an atmosphere of books originating from multiple publishers, for example a retail book store or library. Hence, what is needed is a hypermedia document portal for providing a point of common access to supplemental information corresponding to printed books originating from multiple publishers.

SUMMARY OF THE INVENTION

The inventive arrangements taught herein provide for a confluence of printed and electronic hypermedia documents available in a hypermedia document portal, preferably positioned in a retail kiosk. Notably, the present invention provides to a reader the ability to experience the "magic" of a printed book, and in conjunction with that reading, the ability to be directed to sources of information, which are specifically keyed to that particular book. The term information is used hereinafter to include information and data of all forms, for example, and without limitation, text, illustrations, pictures, photographs, video, movies, slides, voice, speech, music and sound. The confluence is particularly advantageous in the realm of books for children and young adults. The choices of children and young adults, and the choices of parents on their behalf, are no longer limited to choosing between printed and CD ROM copies of the same books.

A method for supplying hierarchical supplementary information related to printed books in a portal can include several steps. First, a portal of supplementary information related to printed books can be established. The supplementary information can be stored in hypermedia documents retrievable through the portal. The establishing step can include establishing a portal of supplementary information related to printed books, where the supplementary information is stored in hypermedia documents; and, storing the hypermedia documents in a fixed storage. In that case, the hypermedia documents can be retrieved from the fixed storage by a hypermedia document browser responsive to user requests for the hypermedia documents.

In one preferred embodiment, the storing step comprises the step of storing the hypermedia documents in a fixed storage in a hypermedia document server connected to a computer communications network. In that case, the hypermedia documents can be retrieved through the computer communications network responsive to requests by hypermedia document browsers communicatively connected to the hypermedia document server. In a second preferred embodiment, the storing step can include storing the hypermedia documents in a fixed storage in the kiosk. In that case, the hypermedia documents can be retrieved from the fixed storage responsive to requests by a hypermedia document browser executing in the kiosk. Moreover, the fixed storage can be a CD-ROM, a DVD, an optical disk, a digital audio tape, a floppy disk, a hard disk or a removable disk.

The second step of the inventive method can include distributing a plurality of different printed books to a user base. Each book can be associated with a common uniform address. Notably, each common address can reference a corresponding first hypermedia document in the portal. Furthermore, the first hypermedia document can include links to secondary hypermedia documents, where the links corresponding to different user classes. In particular, in the preferred embodiment, the associating step can include the step of including with a particular printed book a bookmark having a reference to common uniform address. In that embodiment, the common uniform address can be an address of a first hypermedia document common to the printed books.

The fourth step can include providing a kiosk for interacting with the portal. Fifth, a user-specified common address can be received from a user in the user base. The user-specified common address can be received through the kiosk. Moreover, the user-specified address can correspond to one of the printed books. Sixth, upon receiving the user-specified common address, a first hypermedia document corresponding to the user-specified common address can be displayed through the kiosk in the portal.

The seventh step can include identifying in the first hypermedia document corresponding to the user-specified common address a user class associated with the user. Finally, in response to identifying the associated user class, one of the secondary hypermedia documents can be displayed through the kiosk. Significantly, the secondary hypermedia documents can have supplementary information pertaining to the book associated with the user-specified common address. Moreover, the supplementary information can be consonant with the associated user class.

In the preferred embodiment, the providing step can include positioning a kiosk in a retail store. The kiosk can include a computer system executing a hypermedia document browser for displaying the portal, a display for displaying hypermedia documents loaded in the browser, and control input means for accepting input from a user of the portal. With regard to the kiosk, the method can include the steps of providing fixed storage with the kiosk wherein the fixed storage can store the portal. The method can also include the steps of connecting the kiosk to a computer communications network; and, enabling the browser to retrieve hypermedia documents from the computer communications network. Similarly, the method can include connecting the kiosk to a POS system in the retail store; enabling the browser to communicate with the POS system through the connection; and, performing purchase transactions of printed books through a hypermedia document displayed in the browser, the purchase transaction consummated by the POS system.

In the preferred embodiment, the identifying step can include identifying a user in the user base with a particular user class the user class selected from the group consisting of adults and children. In that case, the step of displaying secondary hypermedia documents can include, in response to identifying the associated user class, where the identified associated user class corresponds to a child user identity, displaying through the kiosk one of the secondary hypermedia documents having child-oriented supplementary information particular to the printed book. Furthermore, in response to identifying the associated user class, where the identified associated user class corresponds to an adult user identity, one of the secondary hypermedia documents having adult-oriented supplementary information particular to the printed book can be displayed through the kiosk.

In an alternative embodiment in which access to the adult oriented supplementary information is password protected, the step of displaying secondary hypermedia documents can include, in response to identifying the associated user class, where the identified associated user class corresponds to a child user identity, displaying through the kiosk one of the secondary hypermedia documents having child-oriented supplementary information particular to the printed book. Furthermore, in response to identifying the associated user class, where the identified associated user class corresponds to an adult user identity, the adult user identity of the user can be verified; and, responsive to the verification of the adult user identity, one of the secondary hypermedia documents having adult-oriented supplementary information particular to the printed book can be displayed through the kiosk.

The method of the invention can further include the steps of including with each the secondary hypermedia document, a plurality of hyperlinks referring to additional hypermedia documents. Notably, the additional hypermedia documents can be provided by museums, art galleries, colleges, universities, foundations and government administrations and agencies. The step of displaying secondary hypermedia documents also can comprise the steps of: providing a secondary hypermedia document having a plurality of hyperlinks each hyperlink corresponding to one of the plurality of different printed books; accepting a selection of one of the hyperlinks by the user, the selection corresponding to a particular printed book; and, in a third hypermedia document, presenting each page of the particular printed book to the user. In that case, the presenting step can include successively visually displaying each page of the particular printed book at a rate exceeding a speed under which a child user can read each word on each the page.

In a preferred embodiment, the method of the invention can further include providing a fourth hypermedia document having a plurality of hyperlinks, each hyperlink referring to a common activity having supplemental information pertaining to the particular printed book; accepting a selection of one of the hyperlinks by the user; and, in response to the selection, providing a fifth hypermedia document containing the common activity pertaining to the particular printed book. Furthermore, preferably, an electronic guide can be provided in the secondary hypermedia document for supplying audio prompts to the user. In that case, an audio prompt can be outputted in coordination with the electronic guide. Moreover, the audio prompt can prompt the user to select one of the hyperlinks displayed in the secondary hypermedia document.

DETAILED DESCRIPTION OF THE INVENTION

Figure 1:
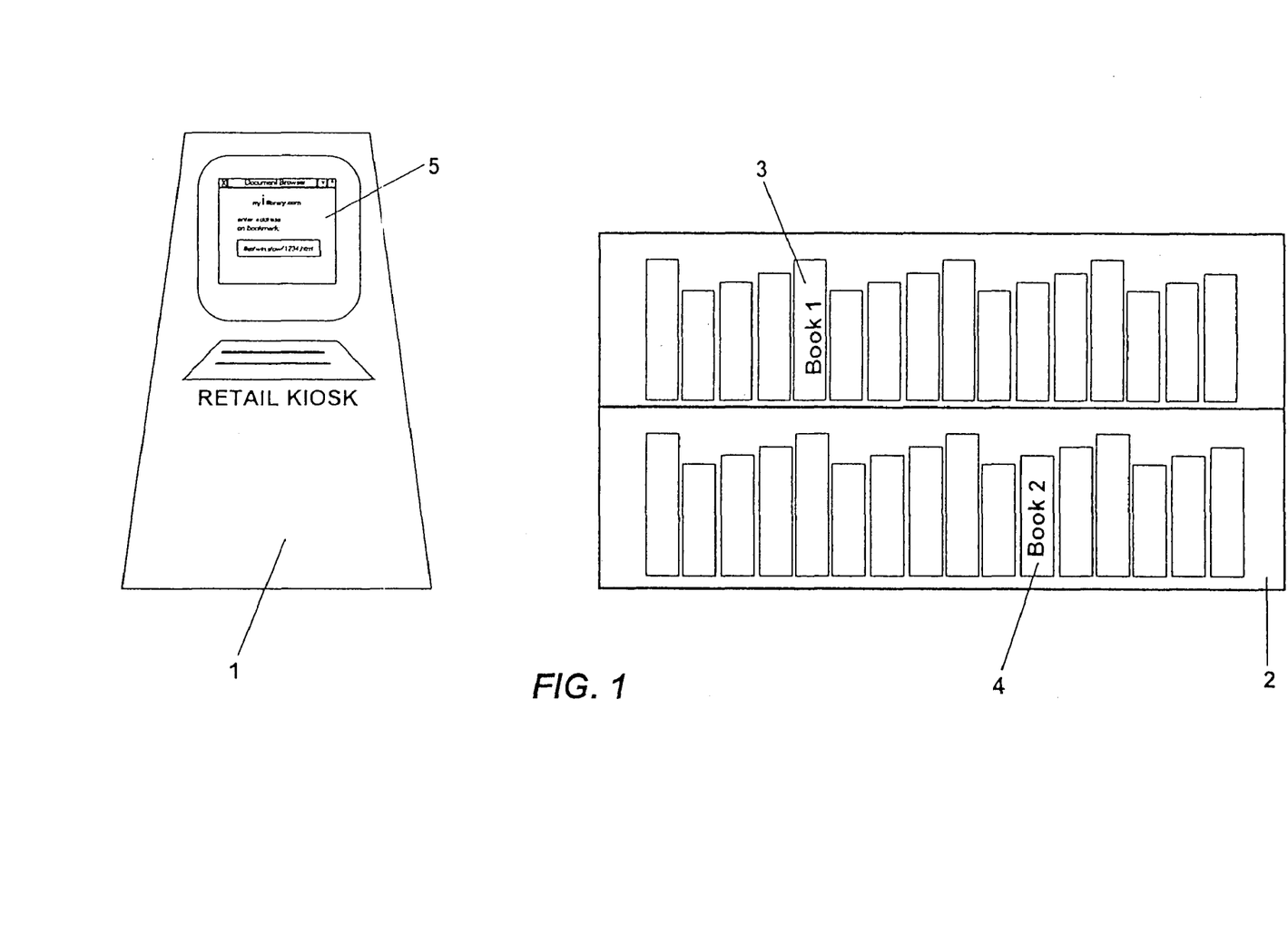
FIG. 1 is a schematic illustration of a retail kiosk positioned in a retail store setting in which a portal for supplying supplementary information related to a printed book can be implemented.

A portal for supplying supplementary information related to a printed book can be implemented in a retail store kiosk as shown in FIG. 1. Specifically, in the figure a retail kiosk 1 is shown proximate to printed books 3, 4 in book shelf 2. In the preferred embodiment, both the kiosk 1 and the book shelf 2 containing the printed books 3, 4 are positioned in a retail store setting, for example a book store. The kiosk 1 can contain a computer system suitable for hosting a portal 5 for supplying supplementary information related to a printed book. Specifically, the kiosk 1 can contain a personal computer, for instance one of the many consumer-oriented personal computers available from retail computer stores or through mail order means.

The personal computer can contain therein each of an operating system and a hypermedia document browser for displaying hypermedia documents, for example Web pages. Preferably, both the operating system and the hypermedia document browser application can be loaded into an internal memory device contained in the personal computer upon initialization of the personal computer in the kiosk 1. The operating system preferably is a GUI-based operating system, for example one of the Windows® family of operating systems manufactured by Microsoft Corporation of Redmond, Wash. Preferably, the operating system facilitates the operation of the personal computer. The operating system can include, for example, communications software for interfacing communications software with communications hardware. An example of communications hardware can include a modem or a network card. The communications software, for example a dial-up program, can cause the hardware to initiate and execute communications links with remote devices. Subsequently, the communications software can manage the transmission and receipt of data flowing across the communications links. Exemplary communications software can include dial-up connectivity software included in the Windows family of operating systems.

In the preferred embodiment, the hypermedia document browser can be a Web browser, for example Netscape Communicator® or Microsoft Internet Explorer®. The hypermedia document browser application preferably permits the personal computer to send and receive requests for hypermedia documents to and from Web servers communicatively connected to a computer communications network, for example the Internet. Alternatively, the hypermedia document browser can load and view hypermedia documents stored locally in the personal computer. The hypermedia document browser can distinguish between a request to load a remotely stored hypermedia document and a request to load a locally stored hypermedia document according to the format of the request itself. Specifically, in one embodiment, a request for a hypermedia document preceded by "http://" denotes a request for document according the hypertext transfer protocol convention defined in the request for comment RFC 2068 "HTTP/1.1". In contrast, a request for a hypermedia document preceded by "file://" denotes a request for a document locally stored in the personal computer.

Significantly, the invention is neither limited by the number of books shelves 2 contained in the retail store nor the number of printed books 3, 4 stored therein. Rather, it is envisioned that the present invention can operate in a retail setting of thousands of books stored in dozens of book shelves. Additionally, several kiosks 1 can be deployed, each hosting a portal 5, for the convenience of retail store customers and users of the portal 5.

Figure 2:
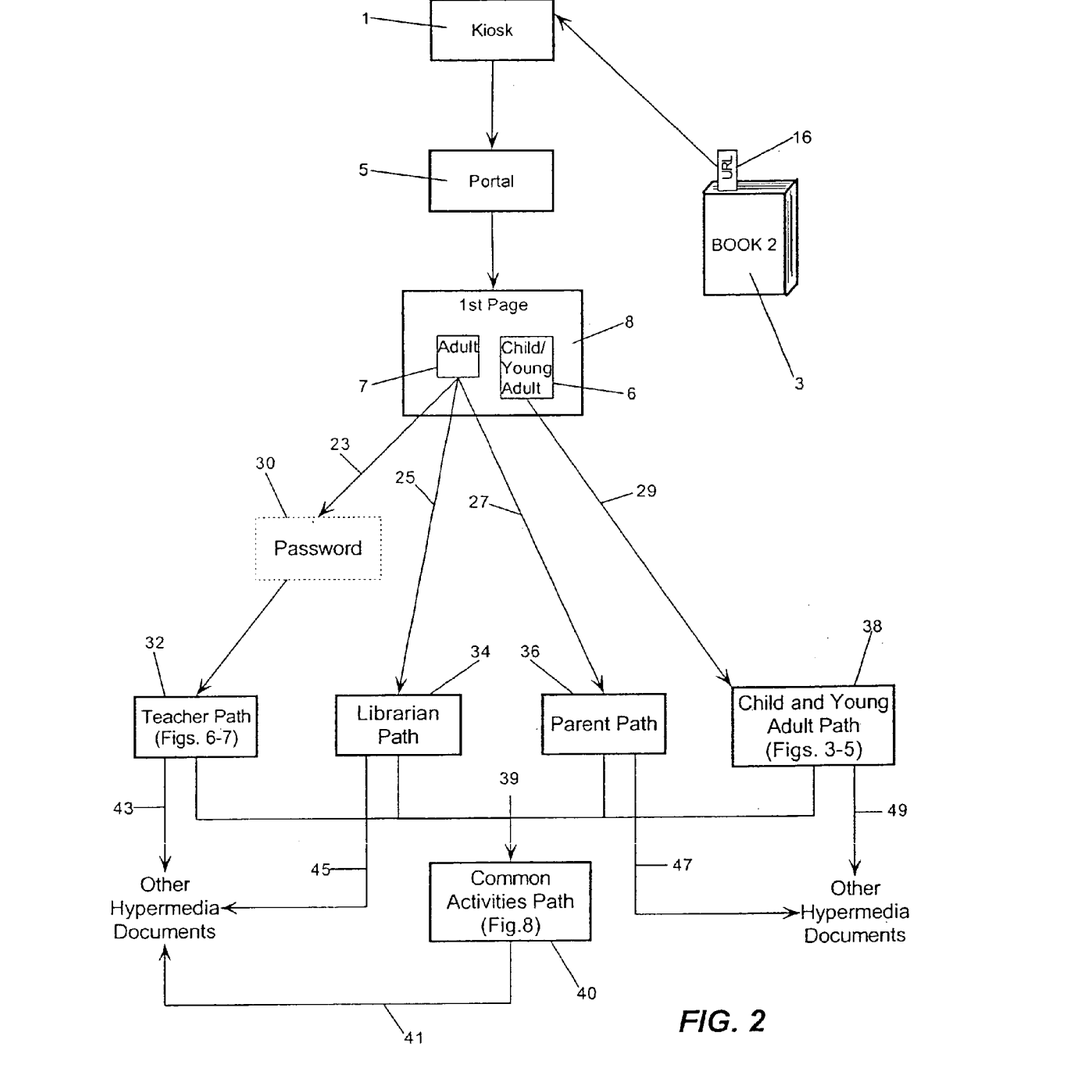
FIG. 2 is a block diagram, in the nature of a flow chart or path map, useful for explaining the various information flow paths according to the inventive arrangements taught herein, by which supplementary information related to a printed book can be supplied to the retail kiosk of FIG. 1.

A portal for supplying supplementary information related to printed books, in accordance with an inventive arrangement, is illustrated in FIG. 2. Initially, a plurality of different printed books having respective content in respective sets of selections adapted for reading by children and reading by young adults, respectively, are distributed. In the preferred embodiment, the printed books are distributed in a retail store setting, for example a book store. A book 3 entitled BOOK 1 is shown for purposes of illustration. A common address, for example a uniform resource locator (URL) is supplied together with each one of the plurality of different printed books, for example in the form of a book mark 16, as shown.

In operation, a portal 5 in the form of a collection of hypermedia documents can be made accessible at a common address in a conventional hypermedia document browser, for example Internet Explorer. The portal 5 can be a collection of Web pages designed and implemented using conventional Web page design techniques, for instance, hypertext markup language (HTML), active server pages (ASP), and the like. The portal 5 can provide to a user thereof means for accessing supplemental information corresponding to a printed book of interest. Notably, because retail stores can contain a substantial quantity of printed books originating from multiple publishing sources, the portal 5 can facilitate the accessibility of supplemental information associated with a user-selected printed book by providing a user-friendly graphical user interface to the supplemental information.

Figure 9:
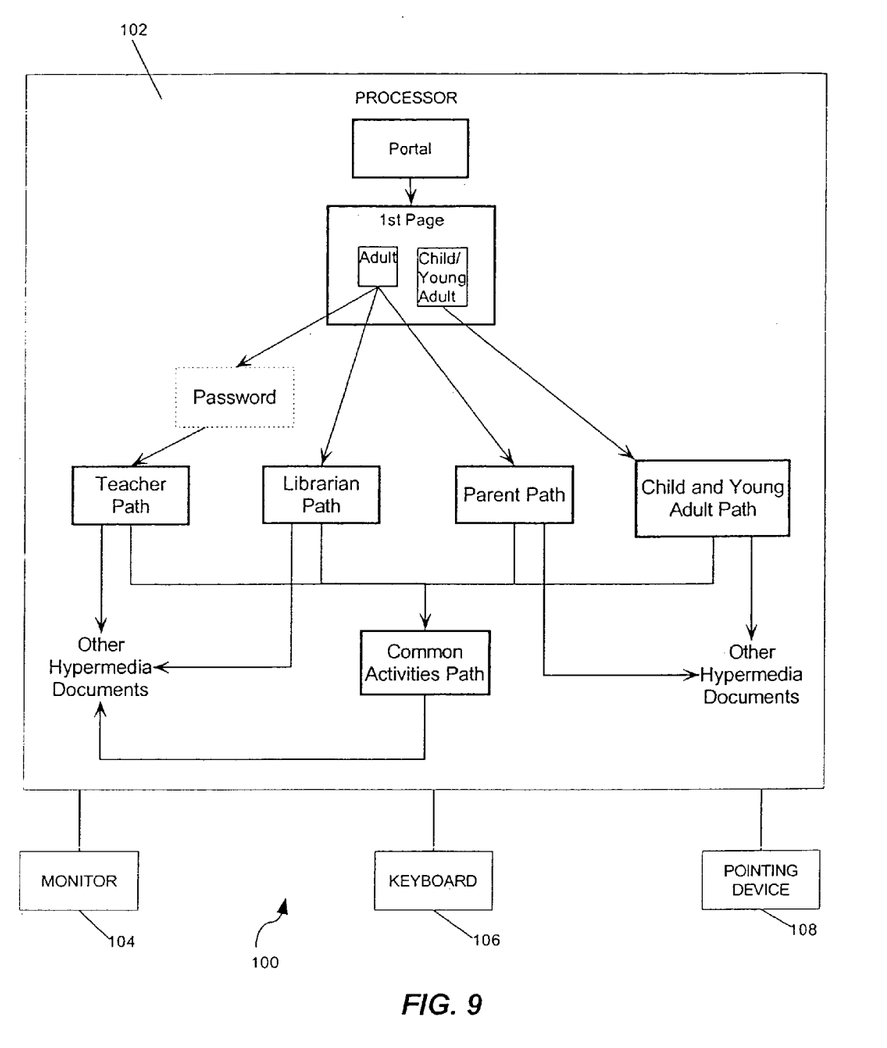
FIG. 9 is a block diagram of a computer programmed for establishing a collection of hypermedia document pages and manipulating images on a graphical user interface, as illustrated in FIGS. 3–8.

The portal 5 can be viewed in a hypermedia document browser executing in the personal computer system in kiosk 1, such as the computer system illustrated in FIG. 9. Notably, the portal 5 can be stored in a hypermedia document server operatively connected to a computer communications network, for instance the Internet. In that case, the computer system in kiosk 1 can include appropriate Internet connectivity hardware and software in order to communicatively connect the computer system to the Internet. Specifically, the computer system in the kiosk 1 can include a modem for performing dial-up services to an Internet Service Provider conventionally linked to the Internet. In that case, the computer system can further include a dial-up program which in cooperation with communications services incorporated in the operating system. Alternatively, the computer system in the kiosk 1 can include network interface circuitry for performing network communications in a local area network conventionally connected to the Internet, for example through a router or gateway.

However, the invention is not so limited in regard to the method of connecting the computer system in the kiosk 1 to the Internet. In particular, in the preferred embodiment, the portal 5 is not stored in a hypermedia document server in the Internet. Rather, in the preferred embodiment the portal 5 is stored in fixed storage, for example a CD-ROM, DVD, Hard Disk, Floppy Disk, Removable Disk, Optical Disk or Digital Audio Tape. As one skilled in the art will recognize, a hypermedia document browser can retrieve and view hypermedia documents locally from fixed storage with as much ease than retrieving and viewing hypermedia documents remotely from the Internet.

Notably, a "home page" of the portal 5 can be pre-loaded and displayed in the hypermedia document browser in the kiosk 1 so as not to require a user to manually enter the URL associated with the portal 5 in order to cause the kiosk 1 to load the portal 5. The portal 5 can provide means to the user for specifying a common address associated with a printed book having a particular title. Upon specifying the common address, a first hypermedia document 8 can be loaded.

The first hypermedia document 8 can have a first set of respective hyperlinks 23, 25, 27 and 29 corresponding to adult-appropriate supplementary information related to the particular book, for example BOOK 2, and corresponding to children-and-young-adult-appropriate supplementary information related to the particular book, for example BOOK 2. Hyperlink 23 leads to an information path 32 of subsequent hypermedia documents with supplementary information appropriate for teachers. It is possible to limit access to the teacher path 32 by using a password protocol 30, shown by a dashed line to indicate an optional aspect of the inventive arrangement. Hyperlink 25 leads to an information path 34 of subsequent hypermedia documents with supplementary information appropriate for librarians. Hyperlink 27 leads to an information path 36 of subsequent hypermedia documents with supplementary information appropriate parents. Hyperlink 29 leads to an information path 38 of subsequent hypermedia documents with supplementary information appropriate for children and young adults.

Each one of the teacher, librarian, parent and child and young adult paths can have further sets of hyperlinks, leading to other hypermedia documents of the portal 5 or leading to further hypermedia documents residing in hypermedia document servers remote from the kiosk 1. Each one of the teacher, librarian, parent and child and young adult paths can also have a common hyperlink 39, for example, to a common activities path 40, related to the particular book, for example BOOK 2. The common activities path 40 has at least one hyperlink, and preferably plurality of hyperlinks 41 to other hypermedia documents originating from outside the portal 5 having supplementary information related to the particular book, for example BOOK 2.

The teacher path 32 has at least one hyperlink, and preferably a plurality of hyperlinks 43 to other hypermedia documents originating from outside the portal 5 having supplemental information related to the particular book, for example BOOK 2. The librarian path 34 has at least one hyperlink, and preferably a plurality of hyperlinks 45 to other hypermedia documents originating from outside the portal 5 having supplemental information related to the particular book, for example BOOK 2. The parent path 36 has at least one hyperlink, and preferably a plurality of hyperlinks 47 to other hypermedia documents originating from outside the portal 5 having supplemental information related to the particular book, for example BOOK 2. The child and young adult path 38 has at least one hyperlink, and preferably a plurality of hyperlinks 49 to other hypermedia documents originating from outside the portal 5 having supplemental information related to the particular book, for example BOOK 2.

The child and young adult path can also include a hyperlink to a story hour, which enables the hypermedia document browser to audibly playback the story or a related story, in its entirety, or serialized by chapter. Illustrations can also be provided. The teacher path 32 has at least one hyperlink, and preferably a plurality of hyperlinks 43 to other hypermedia documents originating from outside portal 5 having supplemental information related to the particular book, for example BOOK 2.

The hyperlinks to other sources of information can include, without limitation, at least one and preferably a plurality of hyperlinks to the following: an activity book, an age-appropriate activity book; titles of related books, literary criticism, museums, art galleries, libraries, colleges, universities, foundations and government administrations and agencies. It will be appreciated that some of these hyperlinks will be hyperlinks to other hypermedia documents of the portal 5 and others will be hyperlinks to other hypermedia documents originating from outside the portal 5. It will also be appreciated that some of these hyperlinks will be more appropriate to some of the paths than to others of the paths. It will further be appreciated that some of these hyperlinks will be appropriate to all of the paths.

The first hypermedia document 8, which may also be thought of as a common log-on path, is shown in detail in FIG. 2. The first hypermedia document 8 preferably appears in response to the user specifying a common address provided with the printed book, for example BOOK 2. Initially, there are two possible selections: a Children and Young Adults selection box 6 and an Adults selection box 7.

Figure 3:
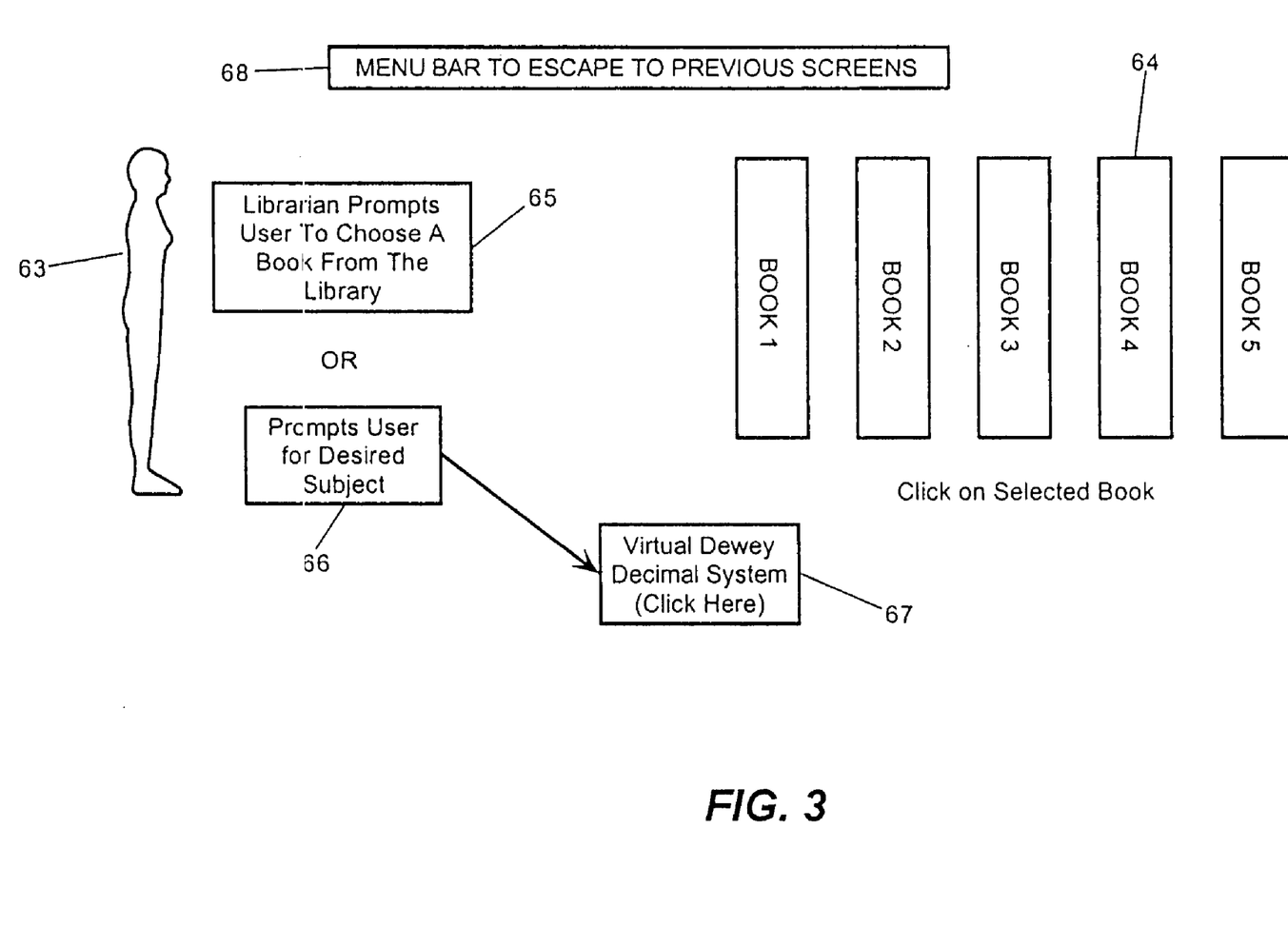
FIGS. 3, 4 and 5 are exemplary, successive display screens defining a communication path for child and young adult users.
Figure 4:
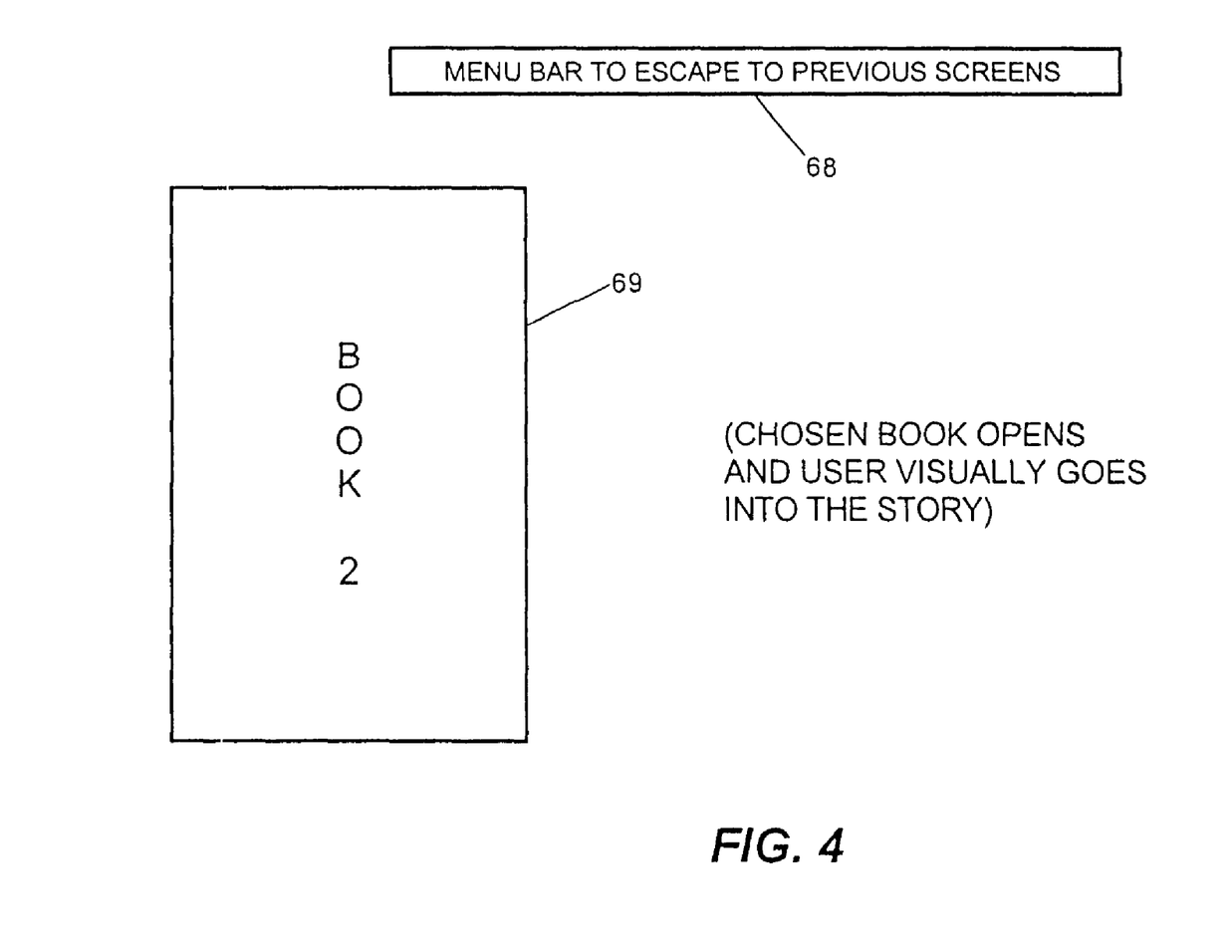
Figure 5:
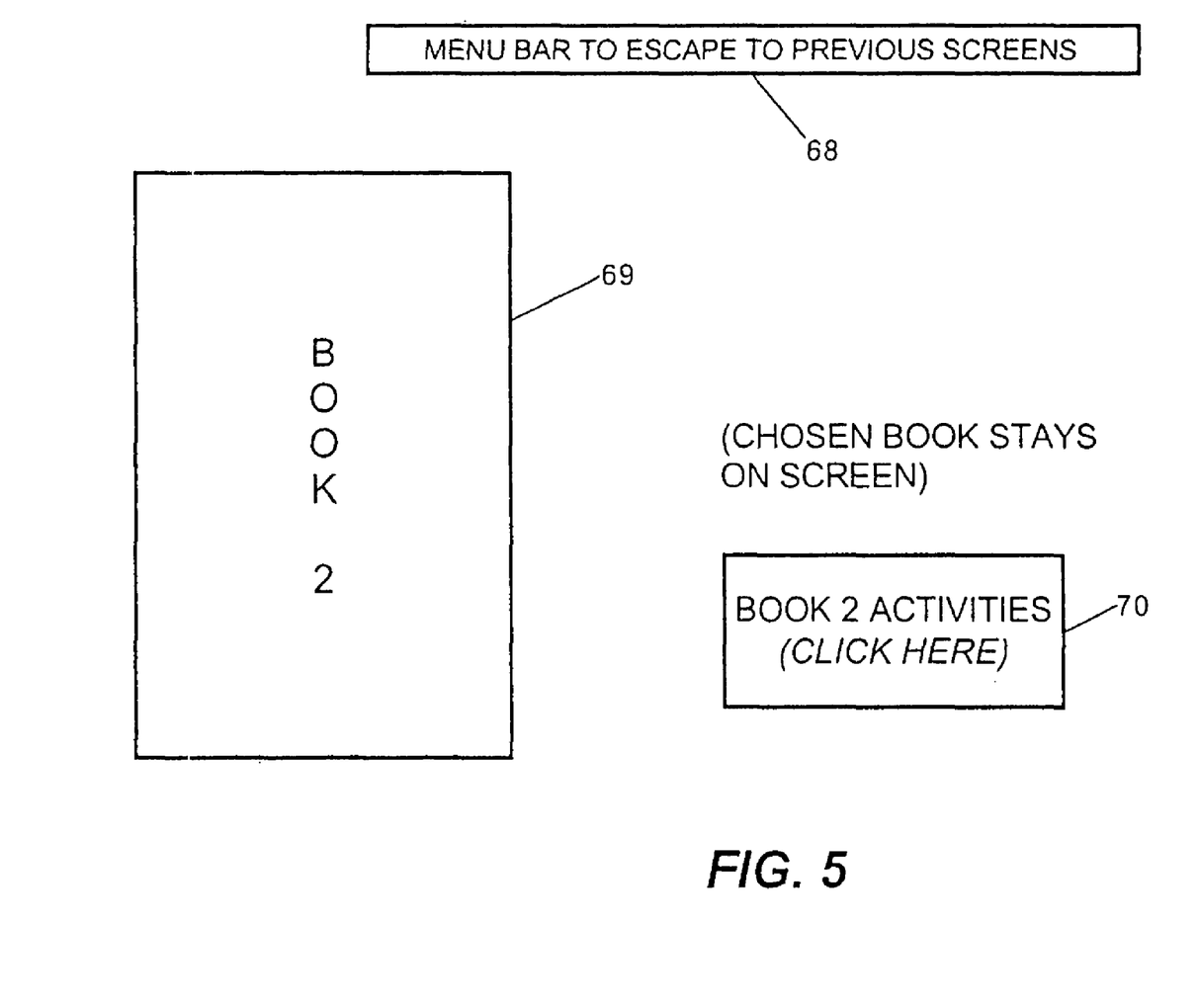

A mouse click, or the like, on the Children and Young Adults box 6 initiates a hyperlink jump to the first screen or page of the child and young adult path 38, shown in FIG. 3. Further screens or pages of the child and young adult path are shown in FIGS. 4 and 5. Unlike selecting the Children and Young Adults box 6, however, a mouse click, or the like on the Adults box 7 initiates a display on the same home page of a Teachers selection box, a Librarians selection box and a Parents selection box. The Teachers, Librarians and Parents selection boxes are used for selecting between the teacher, librarian and parent paths. Further selection of the Teacher box initiates a hyperlink jump to the first screen or page of the teacher path 32, shown in FIG. 6. A further screen or page of the teacher path is shown in FIG. 7. The Adult related selection boxes can alternatively be shown in grey, or other dimmed format, to indicate that those choices can be made, but are not available until the Adults box has first been selected.

Alternatively, selection of the Teachers box can initiate a hyperlink jump to the password protocol box 30, not separately illustrated. Satisfaction of the password protocol would result in a jump to the first screen or page of the teacher path. The password would be made available to teachers in the teachers' versions of the distributed books or upon special request to the administrators of the first web site.

With reference to FIG. 3, an image 63 of a librarian and an image 64 of a set of books can be illustrated, the latter for example as a book case. The librarian can offer an audio prompt, supplementing the visual message boxes 65 and 66, to select one of the books 64 or to enter a virtual Dewey Decimal indexing system by selecting box 67, to look for books on other topics. Selecting the virtual Dewey Decimal system can initiate a hyper link jump to a hypermedia document offering access to such a database. Selecting one of the books, for example BOOK 2, can initiate a jump to the screen or page shown in FIG. 4. Selecting the Menu Bar box 68 provides links back to previous pages. Notably, the books 64 can be selected for purchase by a user. If a book 64 is selected for purchase the purchase transaction can be processed directly by the retail store point of sale (POS) system which can be operatively linked to the computer system in the kiosk. In that case, the kiosk 1, in of itself can act as a terminal in the POS system. Alternatively, in the case where the computer system in the kiosk 1 is linked to the Internet, the computer system can communicate with the POS system using e-commerce transaction mechanisms operable in the Web context and well-known in the art.

With reference to FIG. 4, the selection of BOOK 2 on the screen or page of FIG. 3 can initiate a visual presentation 69 of each page and illustration of BOOK 2 in order, at a rate which is a bit too fast to read, but is slow enough for the younger internet user to be well reminded of the contents of the book. At the conclusion of this quick book presentation, and as shown in FIG. 5, a selection box 70 is then displayed, which can be activated to jump by a hyperlink to an activities screen or page appropriate for BOOK 2. An activities screen or page can be as shown in FIG. 8.

Figure 8:
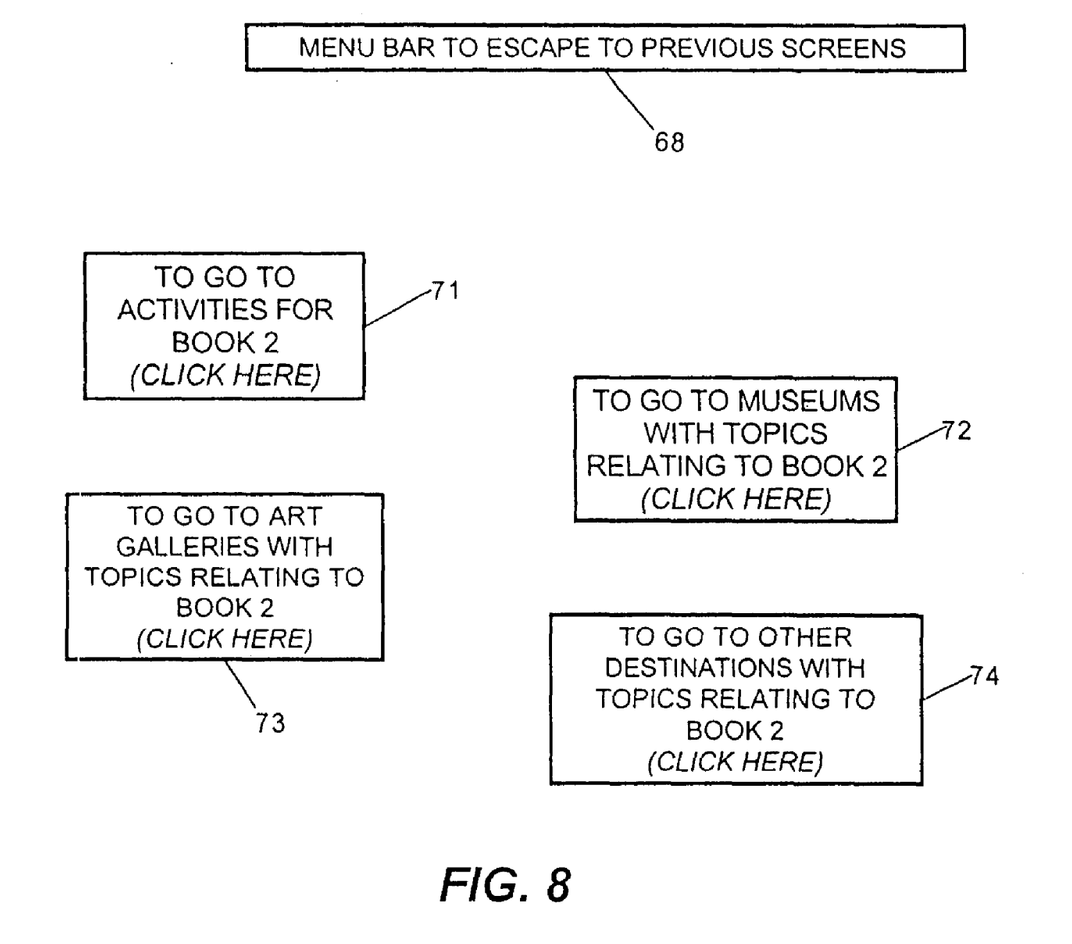
FIG. 8 is an exemplary display screen defining a communication path of common activities for teacher, librarian, parent, child and young adult users.

FIG. 8 also represents the common activities path 40. A selection box 71 provides a link to a series of further hypermedia documents displaying an activity or activity book keyed to BOOK 2. A selection box 72 provides a hyperlink to a further hypermedia document of hyperlinks to museums and/or a direct hyperlink to the web site of a museum. Notably the web site of the museum can comprise a collection of hypermedia documents accessible locally in fixed storage, or remotely through the Internet. For instance, if BOOK 2 relates to dinosaurs, one or more hyperlinks to museums of natural history would be provided. A selection box 73 provides a hyperlink to a further hypermedia document of hyper links to art galleries and/or a direct hyperlink to the web site of an art gallery. Notably the web site of the art gallery can comprise a collection of hypermedia documents accessible locally in fixed storage, or remotely through the Internet. A selection box 74 provides hyperlinks to a further hypermedia document of hyperlinks to other kinds of destinations and/or a direct hyperlink to the web site of such other destination. Notably the web site of such other destinations can comprise a collection of hypermedia documents accessible locally in fixed storage, or remotely through the Internet.

Figure 6:
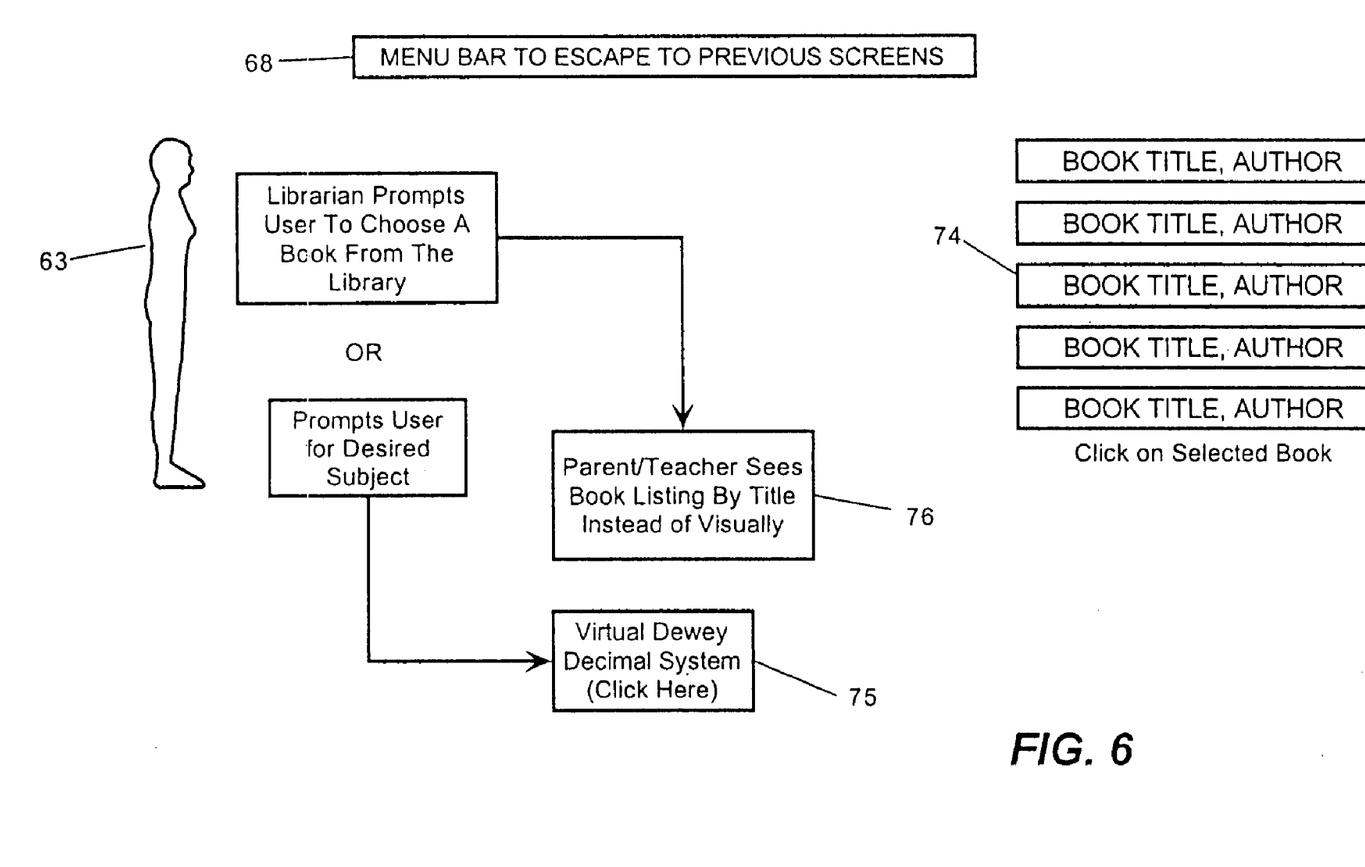
FIGS. 6 and 7 are exemplary, successive display screens defining a communication path for teacher users.
Figure 7:
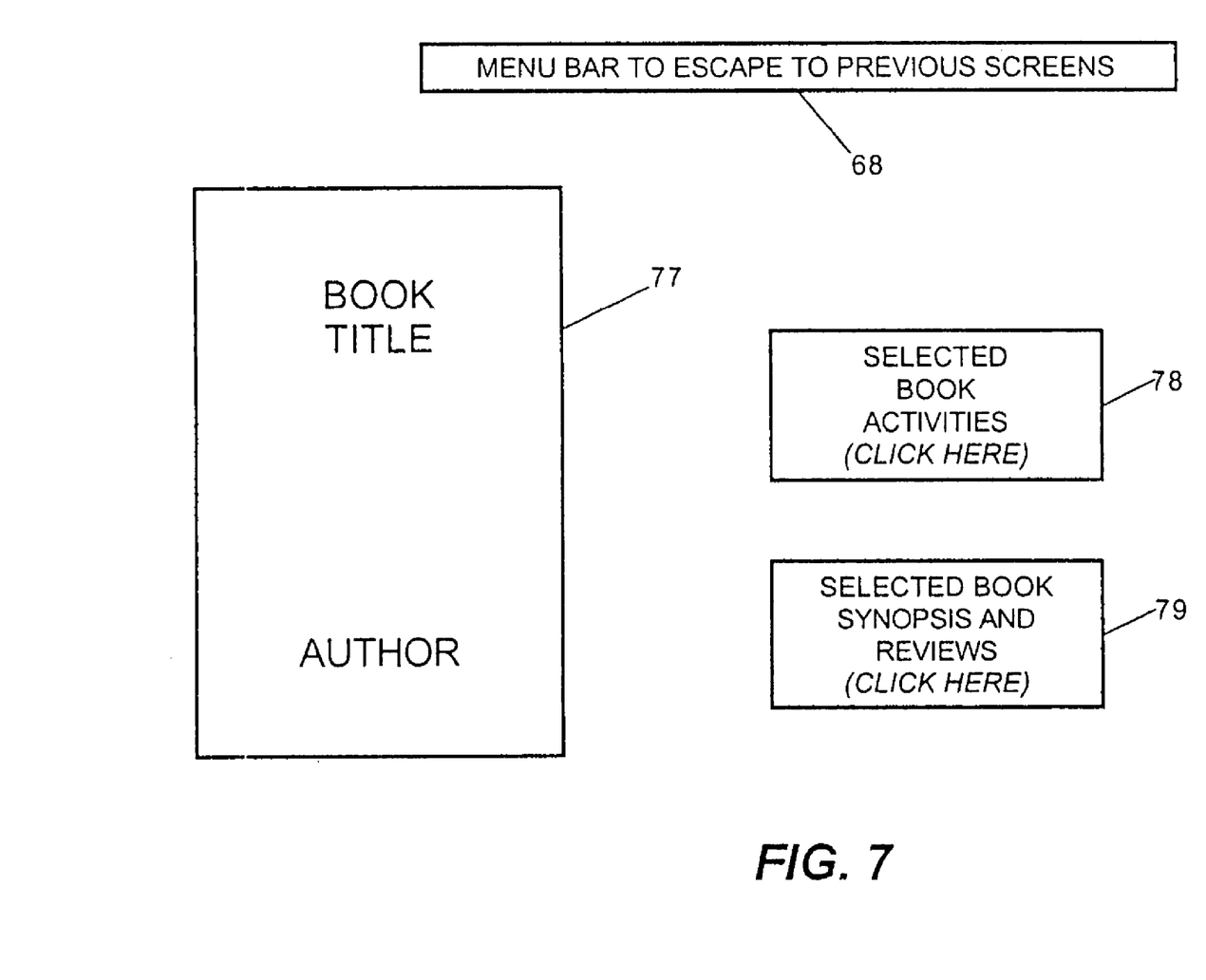

The teacher path 32 is further illustrated by the screens or pages shown in FIGS. 6–7. With reference to FIG. 6, the screen or page can also utilize the image 63 of the librarian, which provides an audio prompt to activate one of the selection boxes. A set of selection boxes 74 for the set of books, including the selected book, is one alternative. A selection box 75 provides a link to a virtual Dewey Decimal system, as in the screen or page shown in FIG. 3. A selection box 76 enables teachers and/or parents to see book listings by title, instead of by icon.

Selection of a book title, from either display format, provides a hyperlink to a page or screen as shown in FIG. 7. A picture 77 of the cover of the selected book is displayed as a reference. In a presently preferred embodiment, teachers will have access to a full readable copy of the book and/or a synopsis of the book, which can be accessed by clicking on the cover, and then clicking on each page and/or illustration in sequence. A selection box 78 can provide a hyperlink to a further hypermedia document of activities related to the selected book, for example, as might be appropriate for an entire classroom. Alternatively, hyperlinks to other hypermedia documents originating from sources outside of the portal 5 can also be provided. Likewise, a selection box 79 provides hyperlinks, to further hypermedia documents or to hypermedia documents originating from sources outside of the portal 5, the hypermedia documents containing one or more selected book synopses and/or literary reviews.

The librarian path 34 and the parent path 36 can overlap in part with the teacher path 32 and can overlap in part with the child and young adult path 38. Accordingly, it is believed to be unnecessary to illustrate the librarian and parent paths with further screens or pages. In any event, the method and apparatus of the inventive arrangements advantageously lend themselves to adaptation if any or all of the divisions between the various adult paths prove inconvenient or impractical or unnecessary.

The method can further comprise the step of displaying a special log on screen, or displaying a hyperlink to the special log on screen, which provides an optional opportunity for the user to provide such personal information as name, age and birthday. This information can be used for a number of purposes. One purpose is to tailor the hyperlinks of the child and young adult path, for example, to related information and data which is also age appropriate. A second purpose is to tailor the hyperlinks of the child and young adult path, for example, to include previous hyperlinks to what appear to be favorite local hypermedia documents, or to include hyperlinks to other hypermedia documents originating from a source other than the portal 5, the other hypermedia documents having particular content related to previously chosen hyperlinks. A third purpose is to tailor the hyperlinks of the teacher or parent path, for example, to include links to other books of related content or authorship, and further, to provide hyperlinks to information identifying libraries and retail establishments where such other books can be borrowed or purchased. A fourth purpose is to tailor the hyperlinks of the respective paths to include new sources of information and data which have been added since the web site browser's last visit to the first web site.

A computer apparatus 100 in accordance with still another inventive arrangement, programmed with a routine of instructions stored in a physical medium for manipulating images on a graphical user interface, is shown in block diagram form in FIG. 9. The interface is adapted to supply supplemental information related to a plurality of different printed books having respective content and distributed with a common internet web site address. The computer apparatus comprises a platform for establishing the portal 5 and subsequent first hypermedia documents 8 retrievable at the common addresses distributed with the printed books 3, 4. The computer apparatus 100 comprises a central processor 102, a monitor 104, a keyboard 106 and a pointing device 108. Other input/output devices can be utilized, for example a touch sensitive screen overlay for the monitor 104. The computer apparatus can be linked to the Internet thereby becoming part of the World Wide Web. The computer processor 102.is programmed with a routine of instructions stored in a physical medium, for example a hard drive and/or a random access memory. The programming is illustrated diagrammatically by the path map of FIG. 1.

The invention is claimed is:

1. A method for supplying hierarchical supplementary information related to printed books in a portal comprising the steps of:

establishing a portal of supplementary information related to printed books, said supplementary information stored in hypermedia documents retrievable through said portal;

distributing to a user base a plurality of different printed books arrayed at a common location accessible to each user of the user base, each printed book being a non-electronic paper-based book and having inserted therein at least one bookmark;

associating each different printed book with a common uniform address, each said common address referencing a corresponding first hypermedia document in said portal and included on the at least one bookmark inserted in the printed book associated with the common address, said first hypermedia document comprising links to secondary hypermedia documents, said links corresponding to different ones of user classes;

providing a kiosk at said common location for interacting with said portal;

receiving from a user in said user base through said kiosk (a) a user-specified common address obtained from the at least one bookmark corresponding to one of said printed books; and (b) a user identifier identifying said user as belonging to at least one of the different user classes, wherein, if the user identifier has not previously been supplied to the user, the user identifier is obtained from an attendant at said common location based upon information presented to said attendant by said user;

responsive to receiving said user-specified common address, displaying trough said kiosk in said portal a first hypermedia document corresponding to said user-specified common address;

searching a stored list of user identifiers cross referencing a plurality of user classes to determine which of the different user classes said user belongs to; and, responsive to identifying said associated user class, displaying through said kiosk one of said secondary hypermedia documents, said secondary hypermedia documents having supplementary information pertaining to said books associated with said user-specified common address, said supplementary information being consonant with said associated user class.

2. The method according to claim 1, wherein said common uniform address is an address of a first hypermedia document common to all said printed books.

3. The method according to claim 1, wherein said providing step comprises the step of:

positioning a kiosk in a retail store;

said kiosk comprising a computer system executing a hypermedia document browser for displaying said portal, a display for displaying hypermedia documents loaded in said browser, and control input means for accepting input from a user of said portal.

4. The method according to claim 3, further comprising the step of:

providing fixed storage with said kiosk;

said fixed storage storing said portal.

5. The method according to claim 4, further comprising the step of:

connecting said kiosk to a computer communications network; and, enabling said browser to retrieve hypermedia documents from said computer communications network.

6. The method according to claim 3, further comprising the step of:

connecting said kiosk to a computer communications network; and, enabling said browser to retrieve hypermedia documents from said computer communications network.

7. The method according to claim 3, further comprising the step of:

connecting said kiosk to a POS system in said retail store;

enabling said browser to communicate with said POS system through said connection; and, performing purchase transactions of printed books through a hypermedia document displayed in said browser, said purchase transaction consummated by said POS system.

8. The method according to claim 1, wherein said identifying step comprises identifying a user in said user base with a particular user class said user class selected from the group consisting of adults and children.

9. The method according to claim 8, wherein said step of displaying secondary hypermedia documents comprises the steps of:

responsive to identifying said associated user class, where said identified associated user class corresponds to a child user identity, displaying through said kiosk one of said secondary hypermedia documents having child-oriented supplementary information particular to said printed books; and, responsive to identifying said associated user class, where said identified associated user class corresponds to an adult user identity, displaying through said kiosk one of said secondary hypermedia documents having adult-oriented supplementary information particular to said printed books.

10. The method according to claim 8, wherein said step of displaying secondary hypermedia documents comprises the steps of:

responsive to identifying said associated user class, where said identified associated user class corresponds to a child user identity, displaying through said kiosk one of said secondary hypermedia documents having child-oriented supplementary information particular to said printed books; and, responsive to identifying said associated user class, where said identified associated user class corresponds to an adult user identity, verifying said adult user identity of said user; and, responsive to said verification of said adult user identity, displaying through said kiosk one of said secondary hypermedia documents having adult-oriented supplementary information particular to said printed books.

11. The method according to claim 1, further comprising the step of:

including with each said secondary hypermedia document a plurality of hyperlinks referring to additional hypermedia documents;

said additional hypermedia documents provided by at least one of the following: museums, art galleries, colleges, universities, foundations and government administrations and agencies.

12. The method according to claim 1, wherein said step of displaying secondary hypermedia documents comprises the steps of:

providing a secondary hypermedia document having a plurality of hyperlinks each hyperlink corresponding to one of said plurality of different printed books;

accepting a selection of one of said hyperlinks by said user, said selection corresponding to a particular printed book; and, in a third hypermedia document, presenting each page of said particular printed book to said user.

13. The method according to claim 12, wherein said presenting step comprises the step of successively visually displaying each page of said particular printed book at a rate exceeding a speed under which a child user can read each word on each said page.

14. The method according to claim 12, further comprising the steps of:

providing a fourth hypermedia document having a plurality of hyperlinks, each said hyperlink referring to a common activity having supplemental information pertaining to said particular printed book;

accepting a selection of one of said hyperlinks by said user; and, in response to said selection, providing a fifth hypermedia document containing said common activity pertaining to said particular printed book.

15. The method according to claim 12, further comprising the steps of:
providing an electronic guide in said secondary hypermedia document for supplying audio prompts to said user; and,
outputting said audio prompt in coordination with said electronic guide, said audio prompt prompting said user to select one of said hyperlinks displayed in said secondary hypermedia document.

16. The method according to claim 1, wherein said establishing step comprises the steps of:
establishing a portal of supplementary information related to printed books, said supplementary information stored in hypermedia documents; and,
storing said hypermedia documents in a fixed storage;
said hypermedia documents being retrievable from said fixed storage by a hypermedia document browser responsive to user requests for said hypermedia documents.

17. The method according to claim 16, wherein said storing step comprises the step of:
storing said hypermedia documents in a fixed storage in a hypermedia document server connected to a computer communications network;
said hypermedia documents being retrievable through said computer communications network responsive to requests by hypermedia document browsers communicatively connected to said hypermedia document server.

18. The method according to claim 16, wherein said storing step comprises the step of:
storing said hypermedia documents in a fixed storage in said kiosk;
said hypermedia documents being retrievable from said fixed storage responsive to requests by a hypermedia document browser executing in said kiosk.

19. The method according to claim 18, wherein said fixed storage is selected from the group consisting of a CD-ROM, a DVD, an optical disk, a digital audio tape, a floppy disk, a hard disk and a removable disk.

20. A method for supplying hierarchical supplementary information related to printed books in a portal comprising the steps of:
establishing a portal of supplementary information related to printed books, said supplementary information stored in hypermedia documents retrievable through said portal;
distributing to a user base a plurality of different printed books arrayed at a common location accessible to each user of the user base, each printed book being a non-electronic paper-based book and having inserted therein at least one bookmark;
associating each different printed book with a common uniform address, each said common address referencing a corresponding first hypermedia document in said portal and included on the at least one bookmark inserted in the printed book associated with the common address, said first hypermedia document comprising links to secondary hypermedia documents, said links corresponding to different ones of user classes;
providing a kiosk at said common location for interacting with said portal;
receiving from a user in said user base through said kiosk (a) a user-specified common address obtained from the at least one bookmark corresponding to one of said printed books and (b) a user identifier identifying said user as belonging to at least one of the different user classes, wherein said user has been previously supplied the user identifier or receives the user identifier from an attendant in the proximity of the kiosk based upon information presented to said attendant by said user;
responsive to receiving said user-specified common address, displaying through said kiosk in said portal a first hypermedia document corresponding to said user-specified common address;
searching a stored list of user identifiers cross referencing a plurality of user classes to determine which of the different user classes said user;
searching a stored list of and,
responsive to identifying said associated user class, displaying through said kiosk one of said secondary hypermedia documents, said secondary hypermedia documents having supplementary information pertaining to said books associated with said user-specified common address, said supplementary information being consonant with said associated user class;
wherein said secondary hypermedia documents are displayed through said kiosk as a sequence of images, and wherein a rate at which the sequence of images are displayed is based upon the user class to which said user belongs.

* * * * *